United States Patent
Park et al.

(10) Patent No.: US 11,965,756 B2
(45) Date of Patent: Apr. 23, 2024

(54) SENSOR ASSEMBLY FOR DETERMINING ROTATION ABOUT AN AXIS AND LINEAR MOVEMENT PARALLEL TO THE AXIS

(71) Applicant: Infineon Technologies AG, Neubiberg (DE)

(72) Inventors: Joo Il Park, Sungnam (KR); Richard Heinz, Munich (DE); Hyun Jeong Kim, Seoul (KR); Sehwan Kim, Suwon-Si (KR); Stephan Leisenheimer, Deisenhofen (DE); Severin Neuner, Valley (DE)

(73) Assignee: Infineon Technologies AG, Neubiberg (DE)

( * ) Notice: Subject to any disclaimer, the term of this patent is extended or adjusted under 35 U.S.C. 154(b) by 50 days.

(21) Appl. No.: 17/658,032

(22) Filed: Apr. 5, 2022

(65) Prior Publication Data
US 2022/0373359 A1  Nov. 24, 2022

(30) Foreign Application Priority Data

May 19, 2021 (DE) .......................... 102021112958.3

(51) Int. Cl.
*G01D 5/14* (2006.01)

(52) U.S. Cl.
CPC .................... *G01D 5/145* (2013.01)

(58) Field of Classification Search
CPC ...... G01D 5/00; G01D 5/12; G01D 5/14–145; G01D 2205/10; G01D 2205/20; G01R 33/02; G01R 33/032
See application file for complete search history.

(56) References Cited

U.S. PATENT DOCUMENTS

| | | | | |
|---|---|---|---|---|
| 6,057,682 A | * | 5/2000 | McCurley | G01D 5/145 324/207.2 |
| 6,175,233 B1 | * | 1/2001 | McCurley | G01D 5/145 324/207.2 |
| 9,658,083 B1 | | 5/2017 | Posey | |
| 2005/0134257 A1 | * | 6/2005 | Etherington | G01D 5/145 324/207.2 |
| 2013/0088215 A1 | * | 4/2013 | Iwamoto | G01D 5/145 324/207.2 |
| 2013/0179115 A1 | * | 7/2013 | Friedrich | F16H 59/044 324/207.2 |

(Continued)

FOREIGN PATENT DOCUMENTS

| | | |
|---|---|---|
| CN | 109933122 A | 6/2019 |
| DE | 112017006587 T5 | 9/2019 |

(Continued)

*Primary Examiner* — Huy Q Phan
*Assistant Examiner* — David B Frederiksen
(74) *Attorney, Agent, or Firm* — Harrity & Harrity, LLP

(57) ABSTRACT

Implementations relate to a sensor assembly for determining rotation about an axis and linear movement parallel to the axis. The sensor assembly comprises a magnetic structure comprising a north pole radially displaced from the axis and a south pole radially displaced from the axis and opposite to the north pole. The north pole and the south pole of the magnet extend radially into the direction of the axis at an axial end of the sensor assembly. The sensor assembly further comprises at least one sensor element sensitive to magnetic fields radially between the north pole and the south pole.

20 Claims, 3 Drawing Sheets

(56) References Cited

U.S. PATENT DOCUMENTS

| | | | |
|---|---|---|---|
| 2016/0290495 A1* | 10/2016 | Bak | G01D 5/142 |
| 2017/0045379 A1* | 2/2017 | Mitzel | H01F 7/064 |
| 2017/0286638 A1 | 10/2017 | Searle et al. | |
| 2018/0168014 A1 | 6/2018 | Rivas et al. | |
| 2018/0337675 A1 | 11/2018 | Maier | |
| 2018/0363767 A1* | 12/2018 | Kim | G01D 5/145 |
| 2019/0154465 A1* | 5/2019 | Moriya | G01D 5/145 |
| 2020/0271219 A1 | 8/2020 | Hirashita et al. | |
| 2020/0284007 A1 | 9/2020 | Baumstark et al. | |

FOREIGN PATENT DOCUMENTS

| | | |
|---|---|---|
| DE | 102018218809 A1 | 5/2020 |
| JP | 2010032234 A | 2/2010 |
| JP | 6737901 B2 | 8/2020 |
| KR | 20130105823 A | 9/2013 |
| WO | WO-2020094511 A1 * | 5/2020 |

* cited by examiner

SENSOR ASSEMBLY FOR DETERMINING ROTATION ABOUT AN AXIS AND LINEAR MOVEMENT PARALLEL TO THE AXIS

CROSS REFERENCE TO RELATED APPLICATION

This application claims priority to German Patent Application No. 102021112958.3, filed on May 19, 2021, the contents of which are incorporated by reference herein in their entirety.

TECHNICAL FIELD

Examples of the present disclosure relate to a sensor assembly for determining rotation about an axis and linear movement parallel to the axis, in particular for a gear shift mechanism.

BACKGROUND

A control that is typically provided in a vehicle is a gear shift for shifting a gear box of the vehicle. Automatic gear boxes include a limited number of gear selections such as park, reverse, neutral and drive as well as variants thereof. In some automatic gear boxes, a handle or gear shift mechanism is provided, wherein the driver operates the vehicle by moving a position of the handle in a pattern in order to shift gears of the gear box.

Gear shifts in vehicles are increasingly configured as shift-by-wire systems. A shift-by-wire system has, unlike a conventional gear shift, no mechanical linkages to a gear box of the vehicle. Instead, it is electrically connected to an actuator system controlling the gear box by changing a gear or drive mode. Without limitations of the mechanical linkages, an actuation type, force, travel, and lock can be configured for a better user experience and the gear shift can be placed as desired. Moreover, an effort for installation or an adoption of the gear shift to other platforms is reduced. The lack of mechanical linkage to the gear box also results in less noise in a driver compartment of the vehicle.

A shift-by-wire system usually has a control unit which detects a position of the handle by processing data of a sensor assembly, mechanically locks out impermissible gears, and if provided, illuminates a symbol for the gear engaged. The sensor assembly can include mechanical switches that open or close in response to a change of the handle's position. But mechanical switches tend to be expensive, may be subject to wear and corrosion, and may also fail. As the gear box is classified as safety-relevant for the vehicle operation, the sensor assembly is amenable to certain restrictions like ISO 26262 demanding a high reliability of the sensor assembly.

SUMMARY

A need for improvement is addressed by the subject matter of the independent claims. Further, possibly advantageous implementations are addressed by the dependent claims.

According to a first aspect of the present disclosure, it is provided a sensor assembly for determining rotation about an axis and linear movement parallel to the axis. The sensor assembly comprises a magnetic structure comprising a north pole radially displaced from the axis and a south pole radially displaced from the axis and opposite to the north pole. The north pole and the south pole of the magnet extend radially into the direction of the axis at an axial end of the sensor assembly. The sensor assembly further comprises at least one sensor element sensitive to magnetic fields radially between the north pole and the south pole.

The sensor assembly may sense the rotation and linear movement contactless via the magnetic fields and therefore may operate with low wear. The sensor assembly may be part of a handle of a shift-by-wire system in a vehicle. A driver of the vehicle may rotate or push/pull movable portions of the handle to change a gear or select a drive mode.

The magnet may be rotatable about the axis and with respect to the sensor element and linearly movable relative to the sensor element and parallel to the axis.

The sensor assembly may further comprise a metallic shielding at an outer surface of the magnet. The outer surface may not face the sensor element.

In this manner, the sensor assembly may be shielded against electromagnetic interferences, e.g., originating from controls or actuators of a vehicle. Besides, the magnetic fields may be amplified.

The at least one sensor element may be a three-dimensional hall sensor.

With a three-dimensional hall sensor, a number of required sensor elements may be reduced, and an accuracy of the sensor assembly may be increased.

The sensor assembly may further comprise a second sensor element sensitive to magnetic fields.

The second sensor element may ensure redundancy if one sensor element fails.

The first sensor element and the second sensor element may be located at equal radial distance to the axis at opposite sides thereof.

The magnetic structure may be shaped as a hollow cylinder closed at the axial end.

The one half of the hollow cylinder may form the north pole and the other half of the cylinder may form the south pole.

According to a second aspect of the present disclosure, it is provided a gear shift mechanism for controlling a gearbox. The gear shift mechanism comprises a sensor assembly as described above.

The gear shift mechanism may further comprise a handle coupled to the magnet such that a rotation of the handle to select a drive mode rotates the magnet. The handle may be further coupled to the magnet such that pushing the handle or a portion thereof causes a linear movement of the magnet parallel to the axis.

According to a third aspect of the present disclosure, it is provided a vehicle comprising an automatic gearbox and a gear shift mechanism, as described above, to control the automatic gearbox.

BRIEF DESCRIPTION OF THE DRAWINGS

Some examples of apparatuses and/or methods will be described in the following by way of example only, and with reference to the accompanying figures, in which.

DETAILED DESCRIPTION

Figure 1:
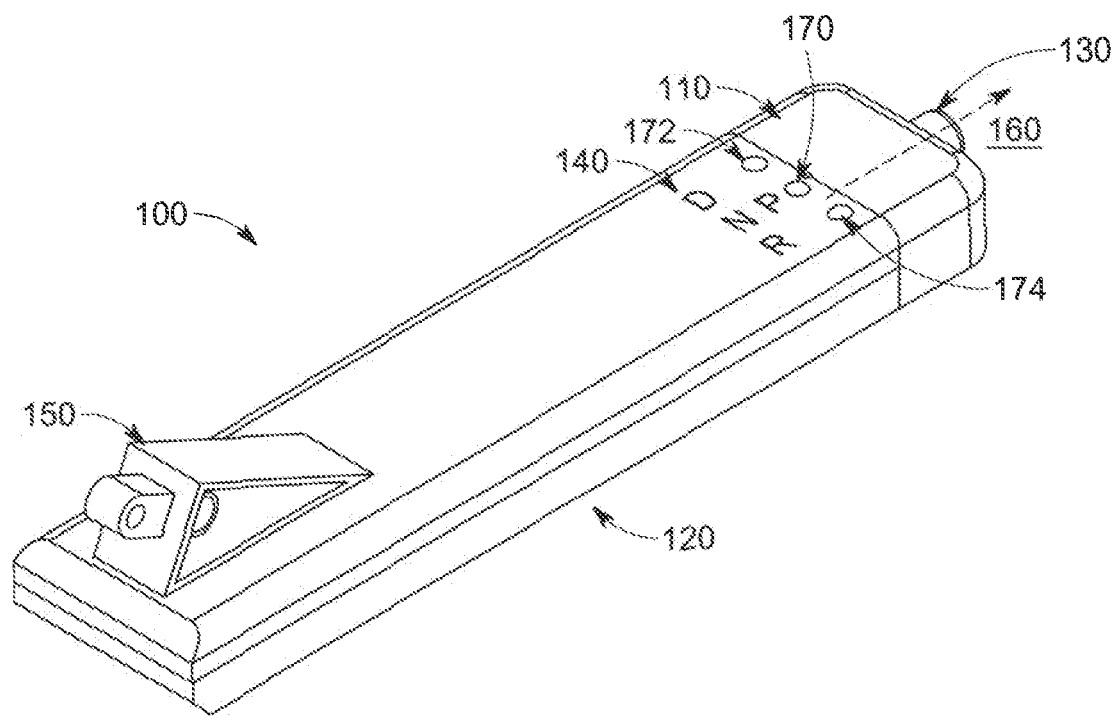
FIG. 1 illustrates a handle of a gear shift mechanism for controlling a gearbox.

Some implementations are now described in more detail with reference to the enclosed figures. However, other possible implementations are not limited to the features of these implementations described in detail. Other implementations may include modifications of the features as well as equivalents and alternatives to the features. Furthermore, the terminology used herein to describe certain implementations should not be restrictive of further possible implementations.

Throughout the description of the figures same or similar reference numerals refer to same or similar elements and/or features, which may be identical or implemented in a modified form while providing the same or a similar function. The thickness of lines, layers and/or areas in the figures may also be exaggerated for clarification.

When two elements A and B are combined using an 'or', this is to be understood as disclosing all possible combinations, e.g., only A, only B as well as A and B, unless expressly defined otherwise in the individual case. As an alternative wording for the same combinations, "at least one of A and B" or "A and/or B" may be used. This applies equivalently to combinations of more than two elements.

If a singular form, such as "a", "an" and "the" is used and the use of only a single element is not defined as mandatory either explicitly or implicitly, further examples may also use several elements to implement the same function. If a function is described below as implemented using multiple elements, further examples may implement the same function using a single element or a single processing entity. It is further understood that the terms "include", "including", "comprise" and/or "comprising", when used, describe the presence of the specified features, integers, steps, operations, processes, elements, components and/or a group thereof, but do not exclude the presence or addition of one or more other features, integers, steps, operations, processes, elements, components and/or a group thereof.

An objective of the present disclosure may be providing an improved concept for determining a position of a handle, such as a knob, or portions thereof.

For instance, the handle may be part of a gear shift mechanism for controlling a gearbox in a vehicle. The handle may be located in a driver compartment of the vehicle (typically in a center console or dashboard of the vehicle) within reach of a driver of the vehicle. The handle may include a diagram of a shift pattern which indicates on which positions the handle or the portions thereof may be moved to select a certain gear or drive mode. A current position of the handle or the portions thereof may indicate a current gear selection to the driver. The driver of the vehicle may want to change a gear or drive mode of the vehicle, for example, when changing from parking to driving. The driver may therefore manually change the current position of the handle or the portions thereof into a position indicating the desired gear or drive mode (according to the shift pattern).

For changing the position, the driver may, for example, rotate or push/pull a movable portion of the handle. In this manner, the driver may select the desired gear or drive mode. In a shift-by-wire system, there may be no mechanical linkage from the handle to the gearbox. Instead, a sensor assembly which may be integrated into an inside of the handle may determine the changing of the handle's position indicative of the gear or drive mode. In other words, the sensor assembly may be able to determine a movement of the handle, in particular a rotation or a linear movement (pushing/pulling) of the handle. For this purpose, the sensor assembly may comprise a magnetic structure and a sensor element sensitive to magnetic fields. The movement of the handle may also cause a movement of the magnetic structure. This may change the magnetic fields sensed by the sensor element. The sensor element may communicate a signal (analog or digital) indicative of the magnetic fields to a control unit. The control unit may process the signal and may accordingly control an actuator that mechanically shifts the gear or drive mode as desired.

Alternatively, the handle may be part of a top column module around a steering wheel of a vehicle. In this case, a position of the handle or parts thereof may be used for controlling wipers, lights, heating of the vehicle or for performing other vehicle functions.

FIG. 1 illustrates a top view on a handle 100 of a gear shift mechanism for controlling a (automatic) gearbox of a vehicle. The handle 100 is an elongated knob with a rotatable part 110 encompassing about one third of the handle 100 at one end of the handle 100. The rotatable part 110 is cylinder-shaped and is mounted on one end to a fixed part 120 of the handle 100, the fixed part 120 constituting the remaining two thirds of the handle 100. A pushable part 130 of the handle 100 projects from a recess of the rotatable part 110 on an opposite end of the rotatable part 110.

A shift pattern 140 is shown on the fixed part 120. The shift pattern 140 includes four options which may refer to usual drive modes of an automatic gearbox: N (Neutral) when no drive may be applied to wheels of the vehicle with an engine running; P (Park) when the gear box may be mechanically locked in position for parking, e.g., via a parking pawl; R (Reverse) for reverse motion; and D (Drive) for forward motion with automatic operation of the gears.

At a second end of the handle 100, an elbow piece 150 protrudes from the fixed part 120. The elbow piece 150 may serve as fixing element for the handle 100 when integrated into a center console, for instance.

The rotatable part 110 may be manually rotated about an axis 160 which may be a longitudinal axis through a center of the handle 100. There may be three positions 170, 172, 174 which the rotatable part 110 may snap into (the points 170, 172, 174 may indicate where an upper side of the rotatable part 110 is oriented). In a neutral position 170, the rotatable part 110 may indicate the above-mentioned neutral mode N. Rotating the rotatable part 110 (e.g., 30 degrees) in one direction about the axis 160 may result in the upper side of the rotatable part 110 orienting to a drive position 172. The drive position 172 may relate to the above-mentioned drive mode D. Starting from the neutral mode N and rotating the rotatable part 110 (e.g., 30 degrees) in the other direction about the axis 160 may result in the upper side of the rotatable part 110 orienting to a reverse position 174. The reverse position 174 may relate to the above-mentioned reverse mode R. When the vehicle is moving forward, rotating the rotatable part 110 to the reverse position 174 may be impeded by a mechanical lock inside the rotatable part 110.

The pushable part 130 may be mechanically locked when the rotatable part 110 is in the drive or reverse position 172, 174. The pushable part 130 may be released when the rotatable part 110 is in the neutral mode 170. When released, the pushable part 130 may be manually pushed further into an interior of the rotatable part 110 (when the driver wants to park the vehicle, for instance). In the interior of the rotatable part 110, the pushable part 130 may snap into a catch. This state may indicate the above-mentioned park mode. A second push of the pushable part 130 may open the catch and release the pushable part 130 (when the driver wants to start the engine of the vehicle and change from park mode to neutral mode, for instance). In other implementations, the handle 100 may be part of a manual (non-automatic) gearbox and display gears on the shift pattern 140. There may be provided more (or less) positions which parts of the handle 100 may be rotated or moved into.

To translate a movement of the handle 100, such as rotating the rotatable part 110 or pushing the pushable part 130, to a change in the gearbox, the gear shift mechanism may control the gearbox according to the movement of the handle 100. For instance, when the driver rotates the rotatable part 110 from the neutral position 170 to the drive position 172, the gear shift mechanism may change the gearbox from neutral mode to drive mode. As there may be no mechanical linkage from the handle 100 to the gearbox, like in shift-by-wire systems, it may be necessary to determine the movement of the handle 100 using a sensor assembly. A signal of the sensor assembly may be used to control an actuator which changes the gear or drive mode of the gearbox. A conventional sensor assembly may comprise mechanical switches, a high number of different sensor elements, or may be sensitive to electromagnetic interferences.

The present disclosure may therefore aim to provide an improved motion measurement concept, in particular for handles in vehicles.

Figure 2:
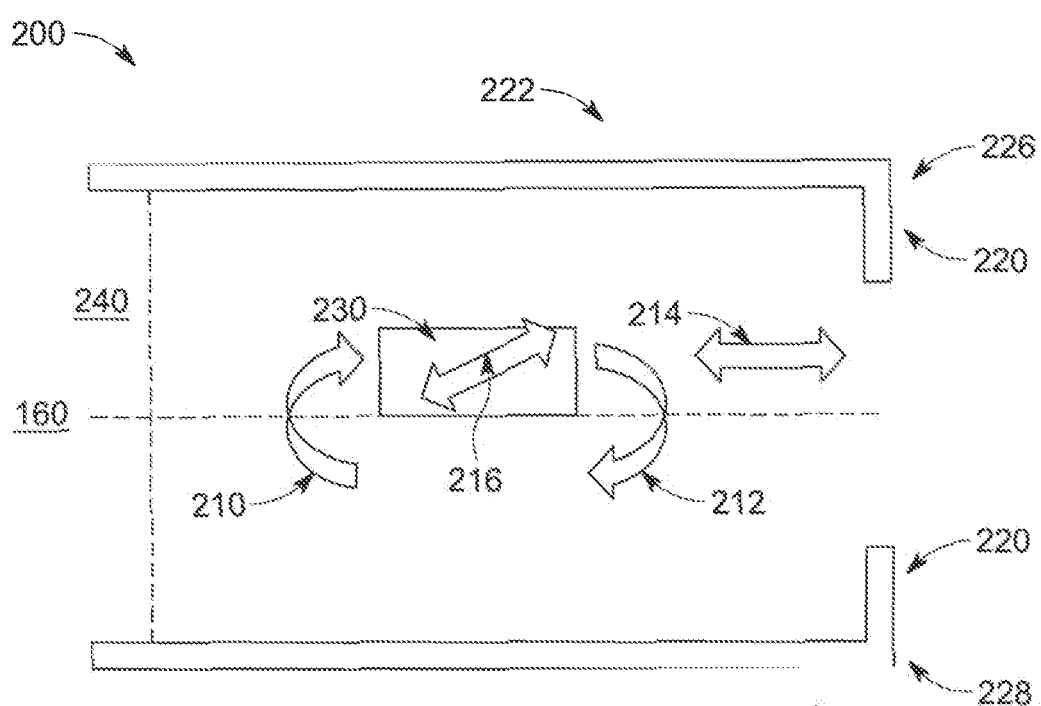
FIG. 2 illustrates a first implementation of a sensor assembly for determining rotation about an axis and linear movement parallel to the axis.

FIG. 2 illustrates a first implementation of a sensor assembly 200 for determining rotation 210, 212 about an axis 160 and linear movement 214 parallel to the axis 160. The sensor assembly 200 includes a magnetic structure 220 with a north pole 222 radially displaced from the axis 160 and a south pole 224 radially displaced from the axis 160 and opposite to the north pole 222. The north pole 222 and the south pole 224 may be a disc or a bar elongated along the axis 160. The north pole 222 and the south pole 224 extend radially into the direction of the axis 160 at an axial end of the sensor assembly 200. For example, the north pole 222 and the south pole 224 may have an elbow piece 226, 228 where one piece runs parallel to the axis 160 and another piece reaches out towards the axis 160. The sensor assembly 200 includes a sensor element 230 sensitive to magnetic fields radially between the north pole 222 and the south pole 226. The sensor element 230 may be placed with one side parallel to the axis 160, displaced from the axis 160 and between the north pole 222 and the south pole 224. The sensor element 230 may be able to sense several different movements of the sensor element 230 relative to the magnetic structure 220. Firstly, the sensor element 230 may be rotated about the axis 160 relative to the magnetic structure 220 in two directions (clockwise, anti-clockwise), as indicated by arrows 210, 212. In this case, the sensor element 230 may sense a change in the magnetic fields as an angle between a surface of the sensor element 230 and magnetic field lines 240 of the magnetic fields may change. The same may happen when the sensor element 230 may be tilted about the axis 160, as indicated by arrow 216. Secondly, the sensor element 230 may be linearly moved with respect to the magnetic structure 220 and parallel to the axis 160, as indicated by arrow 214. In this case, the sensor element 230 may sense a change in the magnetic fields as it may move towards or away from the protruding elbow piece 226, 228 of the magnetic structure 220.

Figure 3A:
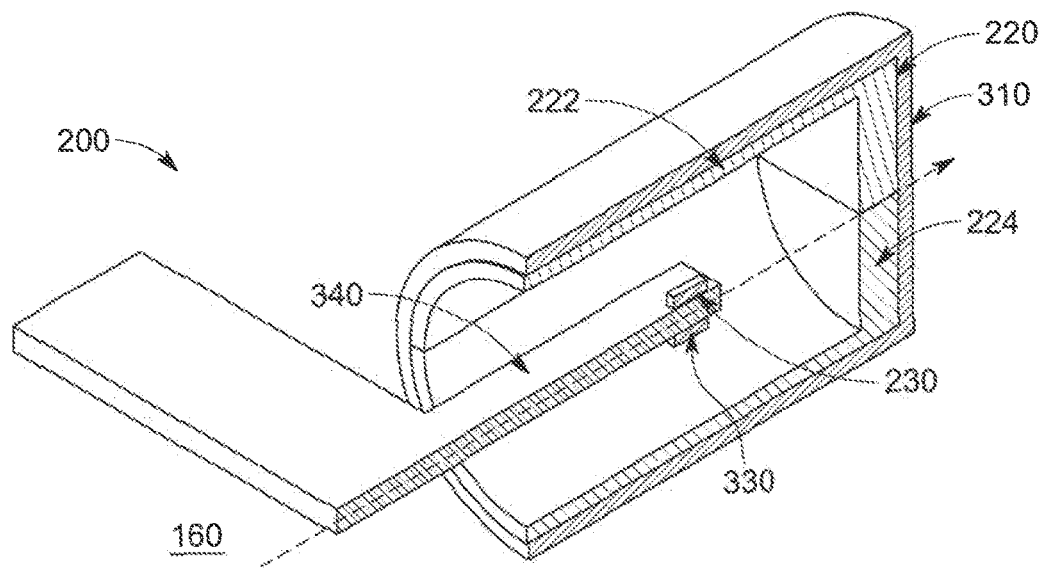
FIGS. 3A-3C illustrate a second implementation of the sensor assembly for determining rotation about the axis and linear movement parallel to the axis.
Figure 3B:
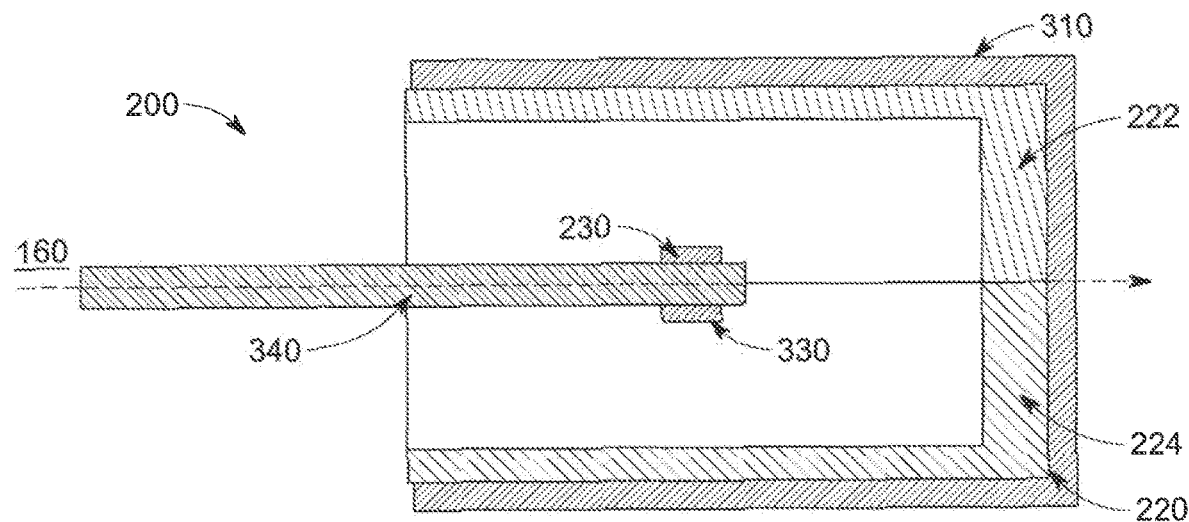
Figure 3C:
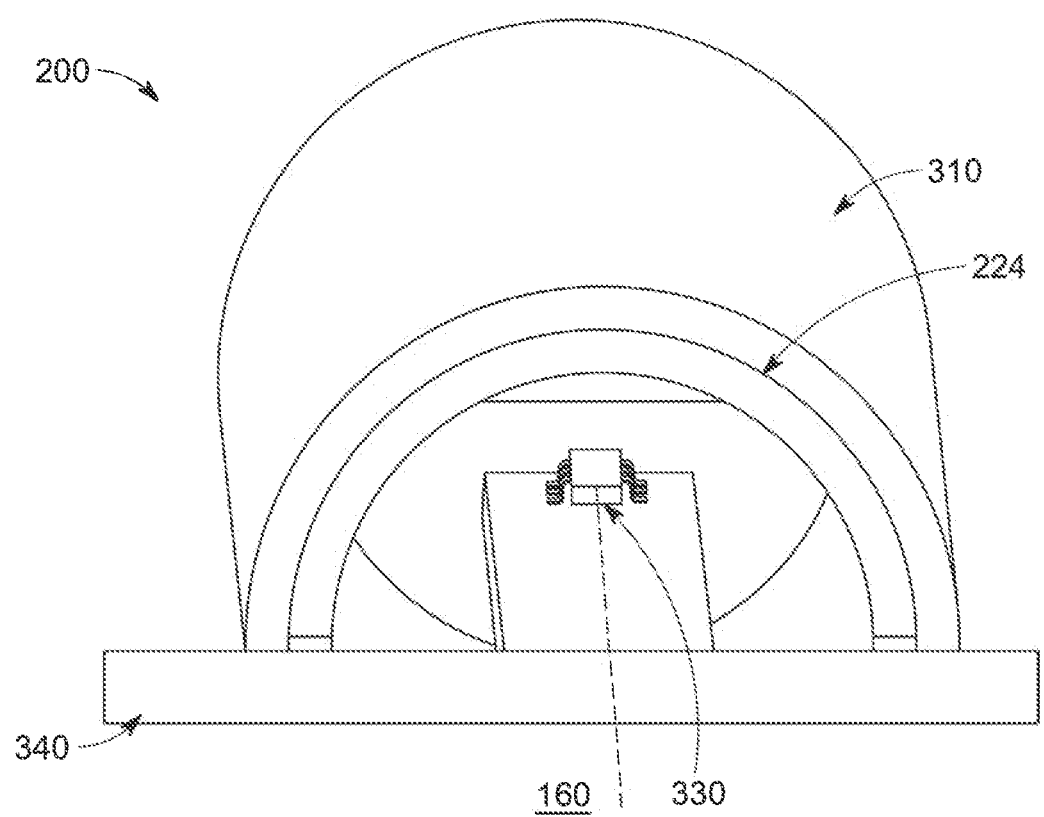

FIGS. 3A-C illustrate a second implementation of the sensor assembly 200 for determining rotation about the axis 160 and linear movement parallel to the axis 160. FIG. 3A shows a diagonal view on a cross section of the sensor assembly 200. FIG. 3B shows a side view of the cross section. FIG. 3C shows a rear view of an upper part of the sensor assembly 200. The sensor assembly 200 may be implemented into a handle, such as the handle 100 shown above. The sensor assembly 200 includes a magnet 220 with a north pole 222 and a south pole 224. The magnet 220 is shaped as a hollow cylinder closed on one end (on the right in FIG. 3A, 3B) and open on the other end (left). The north pole 222 forms one half and the south pole 224 forms the other half of the hollow cylinder. The magnet 220 encompasses the axis 160. The magnet 220 may be of bonded ferrite, nickel, or other magnetic materials. The magnet 220 may generate magnetic fields penetrating a hollow interior of the magnet 220. The magnetic fields may have field lines (240) especially between the north pole 222 and the south pole 224, originating from the north pole 222 and pointing to the south pole 224. A cap 310 covers an outside of the magnet 220. The cap 310 may be of steel or other conductive or magnetic materials. The cap 310 may serve as a shielding against electromagnetic stray fields coming from an outside of the sensor assembly 200. The cap 310 may also increase a magnetic field strength of the magnetic fields.

In the hollow interior of the magnet 220, two sensor elements 230, 330 are radially displaced from the axis 160, at equal distances from the axis 160 and opposite to each other. The sensor elements 230, 330 are mounted on an upper and a bottom side of a printed circuit board 340, respectively. The printed circuit board 340 has an elongated extension protruding from the open end of the magnet 220 into the hollow interior of the magnet 220. The elongated extension leaves a gap between an end of the elongated extension (right) and the closed end of the magnet. The sensor elements 230, 330 may be sensitive to the magnetic fields. The sensor elements 230, 330 may comprise two-dimensional (2D) or three-dimensional (3D) hall sensors. A 2D hall sensor may be capable of sensing x- and y-components of the magnetic fields. A 3D hall sensor may be capable of sensing x-, y-, and z-components of the magnetic fields.

The magnet 220 may be rotatable about the axis 160 with respect to the sensor elements 230, 330. In other words, either the magnet 220 may be rotatable and the sensor elements 230, 330 may stay fixed or the magnet 220 may stay fixed whereas the sensor elements 230, 330 may be rotatable. The cap 310 may rotate together with the magnet 220. The rotation of the magnet 220 may correspond to a rotation of the handle 100 or portions thereof. When rotating, a relative position of the north pole 222 and the south pole 224 with respect to the sensor elements 230, 330 may change. An orientation of the magnetic fields of the magnet 220 may change accordingly. The sensor elements 230, 330 may sense the change of the relative position of the magnet 220 to the sensor elements 230, 330. Consequently, the sensor elements 230, 330 may determine the rotation of the handle 100 or portions thereof.

The magnet 220 may also be movable parallel to the axis 160 with respect to the sensor elements 230, 330. For instance, when a pushable part 130 (not shown) of the handle 100 may be pushed, the magnet 220 may be moved towards the sensor elements 230, 330 reducing the gap between the magnet 220 and the printed circuit board 340. The parallel movement of the magnet 220 may also result in a change in the relative position of the magnet 220 which may be sensed by the sensor elements 230, 330. Consequently, the sensor elements 230, 330 may determine when the pushable part 130 of the handle 100 may be pushed.

The sensor elements 230, 330 may generate a sensor signal indicative of the change of the relative position of the magnet 220. The sensor signal may be transferred to a signal processing unit which processes the sensor signal, e.g., for deciding which drive mode is to choose according to the relative position of the magnet 220. The processed sensor signal may be transferred to a control unit which may activate an actuator. The actuator may apply a clutch of the gearbox according to the selected drive mode.

Dimensions and materials of the sensor assembly 200 may be optimized for a small assembly space, high material saving and good sensing accuracy. For instance, it may be necessary that the magnetic fields have a certain magnetic field strength to be detected by the sensor elements 230, 330. For this purpose, the material of the magnet 220 may be selected accordingly. As the magnetic field strength may diminish with a growing distance to the magnet 220, it may be necessary to place the sensor elements 230, 330 close to the magnet 220. The gap between magnet 220 and the printed circuit board 340 may be configured for a convenient actuation travel of the pushable part 130 of the handle 100.

In other implementations of the present disclosure, there may be more or less sensor elements (230, 330) than shown in FIGS. 3A-C. The sensor elements 230, 330 may be located asymmetrical with respect to the axis 160. The magnet 200 may be partly closed at the one end (right) such that the north pole 222 and the south pole 224 of the magnet 220 extend radially into the direction of the axis 160 at an axial end of the sensor assembly 200. The magnet 200 may be of different shape, for example, comprising two plates as north pole 222 and south pole 224 which are opposite to each other and enclose the sensor elements 230, 330 in between. The cap 310 may be omitted in other implementations, for example, if a shielding is not needed.

In summary, a sensor assembly 200 is provided for determining a relative movement of a magnet 220 to a sensor element 230, 330. Sensing with the sensor elements 230, 330 may be low-wear as it may be contactless. It may be applied in a handle 100 or knob of a shift-by-wire system. The knob may feature turn and push functions for selecting a gear or drive mode. Additionally, a cap 310 may provide a stray field robustness. A 3D hall sensor may reduce a number of sensor elements needed to sense the relative movement of the magnet 220. Alternatively, the sensor assembly 200 may be implemented in a lever at a top column module of a vehicle.

The aspects and features described in relation to a particular one of the previous examples may also be combined with one or more of the further examples to replace an identical or similar feature of that further example or to additionally introduce the features into the further example.

It is further understood that the disclosure of several steps, processes, operations, or functions disclosed in the description or claims shall not be construed to imply that these operations are necessarily dependent on the order described, unless explicitly stated in the individual case or necessary for technical reasons. Therefore, the previous description does not limit the execution of several steps or functions to a certain order. Furthermore, in further examples, a single step, function, process, or operation may include and/or be broken up into several sub-steps, -functions, -processes or -operations.

If some aspects have been described in relation to a device or system, these aspects should also be understood as a description of the corresponding method. For example, a block, device or functional aspect of the device or system may correspond to a feature, such as a method step, of the corresponding method. Accordingly, aspects described in relation to a method shall also be understood as a description of a corresponding block, a corresponding element, a property or a functional feature of a corresponding device or a corresponding system.

The following claims are hereby incorporated in the detailed description, wherein each claim may stand on its own as a separate example. It should also be noted that although in the claims a dependent claim refers to a particular combination with one or more other claims, other examples may also include a combination of the dependent claim with the subject matter of any other dependent or independent claim. Such combinations are hereby explicitly proposed, unless it is stated in the individual case that a particular combination is not intended. Furthermore, features of a claim should also be included for any other independent claim, even if that claim is not directly defined as dependent on that other independent claim.

The invention claimed is:

1. A sensor assembly for determining rotation about an axis and linear movement parallel to the axis, comprising:
   a magnetic structure comprising a north pole radially displaced from the axis and a south pole radially displaced from the axis and opposite to the north pole;
   wherein the north pole and the south pole of the magnetic structure extend radially into a direction of the axis at an axial end of the sensor assembly; and
   at least one sensor element sensitive to magnetic fields radially between the north pole and the south pole,
   wherein the at least one sensor element is mounted to an elongated extension of a printed circuit board,
   wherein the elongated extension protrudes from an open end of the magnetic structure and extends into a hollow interior of the magnetic structure, and
   wherein the magnetic structure is rotatable about the axis and with respect to the at least one sensor element and linearly movable relative to the at least one sensor element and parallel to the axis.

2. The sensor assembly of claim 1, wherein the magnetic structure includes a closed end that is opposite of the open end of the magnetic structure, and
   wherein an end of the elongated extension is positioned a distance from the closed end to enable the magnetic structure to be linearly movable relative to the at least one sensor element.

3. The sensor assembly of claim 1, further comprising a metallic shielding at an outer surface of the magnetic structure, the outer surface not facing the at least one sensor element.

4. The sensor assembly of claim 1, wherein the at least one sensor element is a three-dimensional hall sensor.

5. The sensor assembly of claim 1, wherein the at least one sensor element includes a first sensor element sensitive to magnetic fields and a second sensor element sensitive to magnetic fields.

6. The sensor assembly of claim 5, wherein the first sensor element and the second sensor element are located at equal radial distance to the axis at opposite sides thereof.

7. The sensor assembly of claim 1, wherein the magnetic structure is shaped as a hollow cylinder closed at the axial end.

8. The sensor assembly of claim 7, wherein a first half of the hollow cylinder form the north pole and a second half of the hollow cylinder form the south pole.

9. The sensor assembly of claim 1, wherein the at least one sensor element includes a first sensor element sensitive to magnetic fields and a second sensor element sensitive to magnetic fields, wherein the first sensor element and the second sensor element are mounted to opposite sides of the elongated extension.

10. A gear shift mechanism for controlling a gearbox, the gear shift mechanism comprising:
   a sensor assembly for determining rotation about an axis and linear movement parallel to the axis, wherein the sensor assembly comprises:
      a magnetic structure comprising a north pole radially displaced from the axis and a south pole radially displaced from the axis and opposite to the north pole,
         wherein the north pole and the south pole of the magnetic structure extend radially into a direction of the axis at an axial end of the sensor assembly; and
      at least one sensor element sensitive to magnetic fields radially between the north pole and the south pole,
         wherein the at least one sensor element is mounted to an elongated extension of a printed circuit board,
         wherein the elongated extension protrudes from an open end of the magnetic structure and extends into a hollow interior of the magnetic structure, and
         wherein the magnetic structure is rotatable about the axis and with respect to the at least one sensor element and linearly movable relative to the at least one sensor element and parallel to the axis.

11. The gear shift mechanism according to claim 10, further comprising:
   a handle coupled to the magnetic structure wherein:
      a rotation of the handle to select a drive mode rotates the magnet; and
      a push of at least a portion of the handle causes a linear movement of the magnet parallel to the axis.

12. The gear shift mechanism of claim 10, wherein the sensor assembly further comprises:
   a metallic shielding at an outer surface of the magnetic structure, the outer surface not facing the at least one sensor element.

13. The gear shift mechanism of claim 10, wherein the at least one sensor element is a three-dimensional hall sensor.

14. The gear shift mechanism of claim 10, wherein the magnetic structure is shaped as a hollow cylinder closed at the axial end, wherein a first half of the hollow cylinder form the north pole and a second half of the hollow cylinder form the south pole.

15. A vehicle comprising:
   an automatic gearbox; and
   a gear shift mechanism configured to control the automatic gearbox, wherein the gear shift mechanism comprises:
      a sensor assembly for determining rotation about an axis and linear movement parallel to the axis, wherein the sensor assembly comprises:
         a magnetic structure comprising a north pole radially displaced from the axis and a south pole radially displaced from the axis and opposite to the north pole,
            wherein the north pole and the south pole of the magnetic structure extend radially into a direction of the axis at an axial end of the sensor assembly; and
         at least one sensor element sensitive to magnetic fields radially between the north pole and the south pole,
            wherein the at least one sensor element is mounted to an elongated extension of a printed circuit board,
            wherein the elongated extension protrudes from an open end of the magnetic structure and extends into a hollow interior of the magnetic structure, and
            wherein the magnetic structure is rotatable about the axis and with respect to the at least one sensor element and linearly movable relative to the at least one sensor element and parallel to the axis.

16. The vehicle of claim 15, wherein the magnetic structure includes a closed end that is opposite of the open end of the magnetic structure, and
   wherein an end of the elongated extension is positioned a distance from the closed end to enable the magnetic structure to be linearly movable relative to the at least one sensor element.

17. The vehicle of claim 15, wherein the sensor assembly further comprises:
   a metallic shielding at an outer surface of the magnetic structure, the outer surface not facing the at least one sensor element.

18. The vehicle of claim 15, wherein the at least one sensor element is a three-dimensional hall sensor.

19. The vehicle of claim 15, wherein the at least one sensor element includes a first sensor element sensitive to magnetic fields and a second sensor element sensitive to magnetic fields, wherein the first sensor element and the second sensor element are located at equal radial distance to the axis and at opposite sides thereof.

20. The vehicle of claim 15, wherein the magnetic structure is shaped as a hollow cylinder closed at the axial end, wherein a first half of the hollow cylinder form the north pole and a second half of the hollow cylinder form the south pole.

* * * * *